United States Patent
Shamma et al.

(10) Patent No.: US 12,425,255 B2
(45) Date of Patent: Sep. 23, 2025

(54) SYSTEM AND METHOD FOR LEGITIMATE CO-WORKER REMOTE ENCOUNTER INTERACTIONS

(71) Applicant: TOYOTA RESEARCH INSTITUTE, INC., Los Altos, CA (US)

(72) Inventors: David A. Shamma, San Francisco, CA (US); Candice Hogan, Foster City, CA (US); Shabnam Hakimi, San Francisco, CA (US); Yue Weng, San Mateo, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/392,722

(22) Filed: Dec. 21, 2023

(65) Prior Publication Data

US 2025/0211458 A1  Jun. 26, 2025

(51) Int. Cl.
| | |
|---|---|
| H04L 65/1093 | (2022.01) |
| G06F 3/04817 | (2022.01) |
| G06F 3/0482 | (2013.01) |
| G06F 3/0484 | (2022.01) |
| G06F 16/9537 | (2019.01) |
| H04L 12/18 | (2006.01) |

(52) U.S. Cl.
CPC ...... *H04L 12/1818* (2013.01); *G06F 3/04817* (2013.01); *H04L 65/1093* (2013.01)

(58) Field of Classification Search
CPC ............. H04L 12/1818; H04L 65/1093; G06F 3/04817; G06F 3/0484; G06F 16/9537; G06F 3/0482

USPC .......................................................... 709/204
See application file for complete search history.

(56) References Cited

U.S. PATENT DOCUMENTS

| | | | |
|---|---|---|---|
| 5,764,639 A | 6/1998 | Staples et al. | |
| 8,145,998 B2 | 3/2012 | Leahy et al. | |
| 9,407,704 B2 | 8/2016 | Yu et al. | |
| 10,902,263 B1 * | 1/2021 | Angel | A61H 3/061 |

(Continued)

FOREIGN PATENT DOCUMENTS

WO    2012053001 A2    4/2012

OTHER PUBLICATIONS

Bellotti, Victoria, et al., "Walking Away from the Desktop Computer: Distributed Collaboration and Mobility in a Product Design Team," 1996 ACM, Inc., Computer Supported Cooperative Work, pp. 209-218.

(Continued)

*Primary Examiner* — Jude Jean Gilles
(74) *Attorney, Agent, or Firm* — SEYFARTH SHAW LLP

(57) ABSTRACT

A method for legitimate remote co-worker encounters is described. The method includes scheduling a virtual walkabout of a user in a remote environment. The method also includes identifying a remote co-worker in the remote environment to facilitate an interaction with during the virtual walkabout of the user. The method further includes outputting a notification in response to identifying the remote co-worker in the remote environment. The method also includes interfacing the user with the remote co-worker to facilitate the interaction with the remote co-worker during the virtual walkabout of the user.

20 Claims, 10 Drawing Sheets

(56) References Cited

U.S. PATENT DOCUMENTS

| | | |
|---|---|---|
| 11,127,210 B2 | 9/2021 | Novak et al. |
| 11,210,877 B1* | 12/2021 | Amadi ............... G07C 9/00309 |
| 2002/0158873 A1 | 10/2002 | Williamson |
| 2004/0006566 A1* | 1/2004 | Taylor .................... G06Q 10/10 |
| 2012/0190386 A1* | 7/2012 | Anderson ............... G01S 19/14 |
| | | 455/456.3 |
| 2019/0355178 A1* | 11/2019 | Hermina Martinez ...................... |
| | | G06V 20/593 |
| 2020/0043068 A1* | 2/2020 | McQuade .............. G06Q 30/08 |
| 2023/0214097 A1* | 7/2023 | Pearson ................ G06F 3/0484 |

OTHER PUBLICATIONS

Carter, S., et al., "Building Connections among Loosely Coupled Groups: Hebb's Rule at Work," Computer Supported Cooperative Work, 13: 305-327, 2004.

Tang, John C., et al., "Exploring Patterns of Social Commonality Among File Directories at Work," CHI 2007 Proceedings, Collaboration at Work, Apr. 28-May 3, 2007.

* cited by examiner

SYSTEM AND METHOD FOR LEGITIMATE CO-WORKER REMOTE ENCOUNTER INTERACTIONS

BACKGROUND

Field

Certain aspects of the present disclosure generally relate to machine assisted cognition and, more particularly, to a system and method for legitimate co-worker remote encounter interactions.

Background

Recent studies find that remote workers become more siloed in how they communicate, engaging in fewer real-time conversations, and spending fewer hours in meetings. Consequently, a full-time remote workforce may have a harder time acquiring and sharing new information, negatively impacting productivity and innovation among information workers in the future. By contrast, in an office, people run into each other all the time. These could be someone passing by the desk or in the kitchen getting coffee. These run-into encounters spark meetings, ideas, or just friendly banter, which is missing from remote work. A system and/or method for recreating random encounters with colleagues in a workgroup in a remote environment, is desired.

SUMMARY

A method for legitimate remote co-worker encounters is described. The method includes scheduling a virtual walkabout of a user in a remote environment. The method also includes identifying a remote co-worker in the remote environment to facilitate an interaction with during the virtual walkabout of the user. The method further includes outputting a notification in response to identifying the remote co-worker in the remote environment. The method also includes interfacing the user with the remote co-worker to facilitate the interaction with the remote co-worker during the virtual walkabout of the user.

A non-transitory computer-readable medium having program code recorded thereon for legitimate remote co-worker encounters is described. The program code is executed by a processor. The non-transitory computer-readable medium includes program code to schedule a virtual walkabout of a user in a remote environment. The non-transitory computer-readable medium also includes program code to identify the remote co-worker in the remote environment to facilitate an interaction with during the virtual walkabout of the user. The non-transitory computer-readable medium further includes program code to output a notification in response to identifying the remote co-worker in the remote environment. The non-transitory computer-readable medium also includes program code to interface the user with the remote co-worker to facilitate the interaction with the remote co-worker during the virtual walkabout of the user.

A system for legitimate remote co-worker encounters is described. The system includes a virtual walkabout module to schedule a virtual walkabout of a user in a remote environment. The system also includes a remote co-worker identification module to identify the remote co-worker in the remote environment to facilitate an interaction with during the virtual walkabout of the user. The system further includes a remote encounter notification module to output a notification in response to identifying the remote co-worker in the remote environment. The system also includes a remote co-worker interaction facilitation module to interface the user with the remote co-worker to facilitate the interaction with the remote co-worker during the virtual walkabout of the user.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
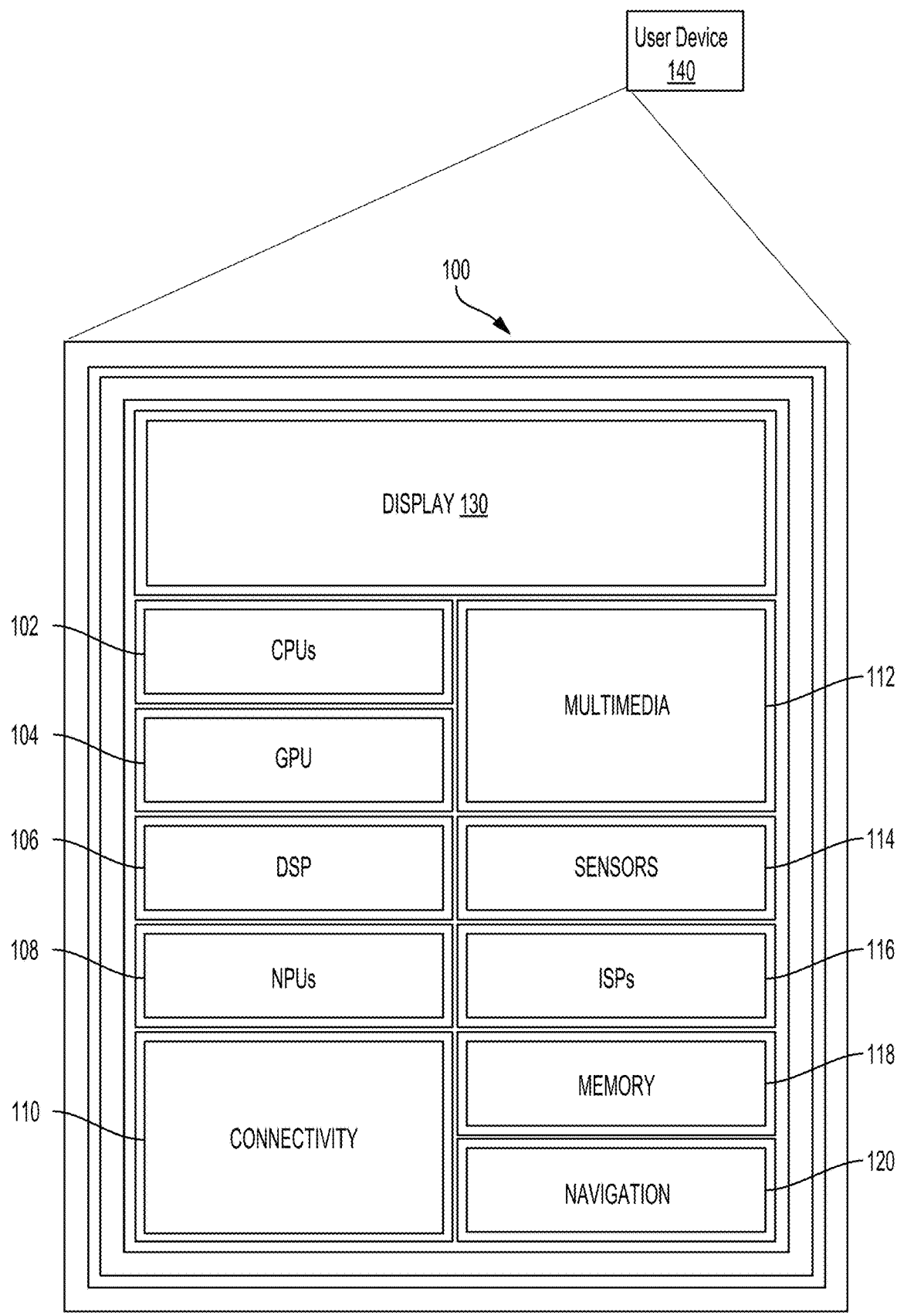
FIG. 1 illustrates an example implementation of designing a neural network using a system-on-a-chip (SOC) of a co-worker remote encounter system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Recent studies find that remote workers become more siloed in how they communicate, engaging in fewer real-time conversations, and spending fewer hours in meetings. Consequently, a full-time remote workforce may have a harder time acquiring and sharing new information, negatively impacting productivity and innovation among information workers in the future. By contrast, in an office, people run into each other all the time. These could be someone passing by the desk or in the kitchen getting coffee. These run-into encounters spark meetings, ideas, or just friendly banter, which is missing from remote work.

Currently, online status information is limited to just "Sue is online" and "Sue is offline." Other systems made to prompt interaction follow speed dating or random (chat roulette) style mechanisms. There have been some in person 'display lights' (like a little led on a monitor's top edge) that people would use to indicate "don't interrupt me" but that's just tangentially related. Aspects of the present disclosure approach also support deeper interactions when desired, promoting user autonomy in the choice to engage in walkabouts and conversations. A system and/or method for recreating random encounters with colleagues in a workgroup in a remote environment, is desired.

Various aspects of the present disclosure are directed to recreating random encounters with colleagues in a workgroup in a remote environment. Because the side encounters that happen in a physical office don't happen in remote workspaces, various aspects of the present disclosure are directed to recreating those passing encounters with minimal disruption to create social engagements in a remote workplace. In some aspects of the present disclosure, presence notifications are created to simulate the random walk-by encounters one might have in a physical office space.

FIG. 1 illustrates an example implementation of the aforementioned system and method for a co-worker remote encounter using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risc Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 may include code to legitimate remote co-worker encounters. The instructions loaded into a processor (e.g., NPU 108) may also include code to schedule a virtual walkabout of a user in a remote environment. The instructions loaded into the processor (e.g., NPU 108) may also include code to identify remote co-worker in the remote environment to facilitate an interaction with during the virtual walkabout of the user. The instructions loaded into the processor (e.g., NPU 108) may also include code to output a notification in response to identifying the remote co-worker in the remote environment. The instructions loaded into the processor (e.g., NPU 108) may also include code to interface the user with remote co-worker to facilitate an interaction with the remote co-worker during the virtual walkabout of the user.

Figure 2:
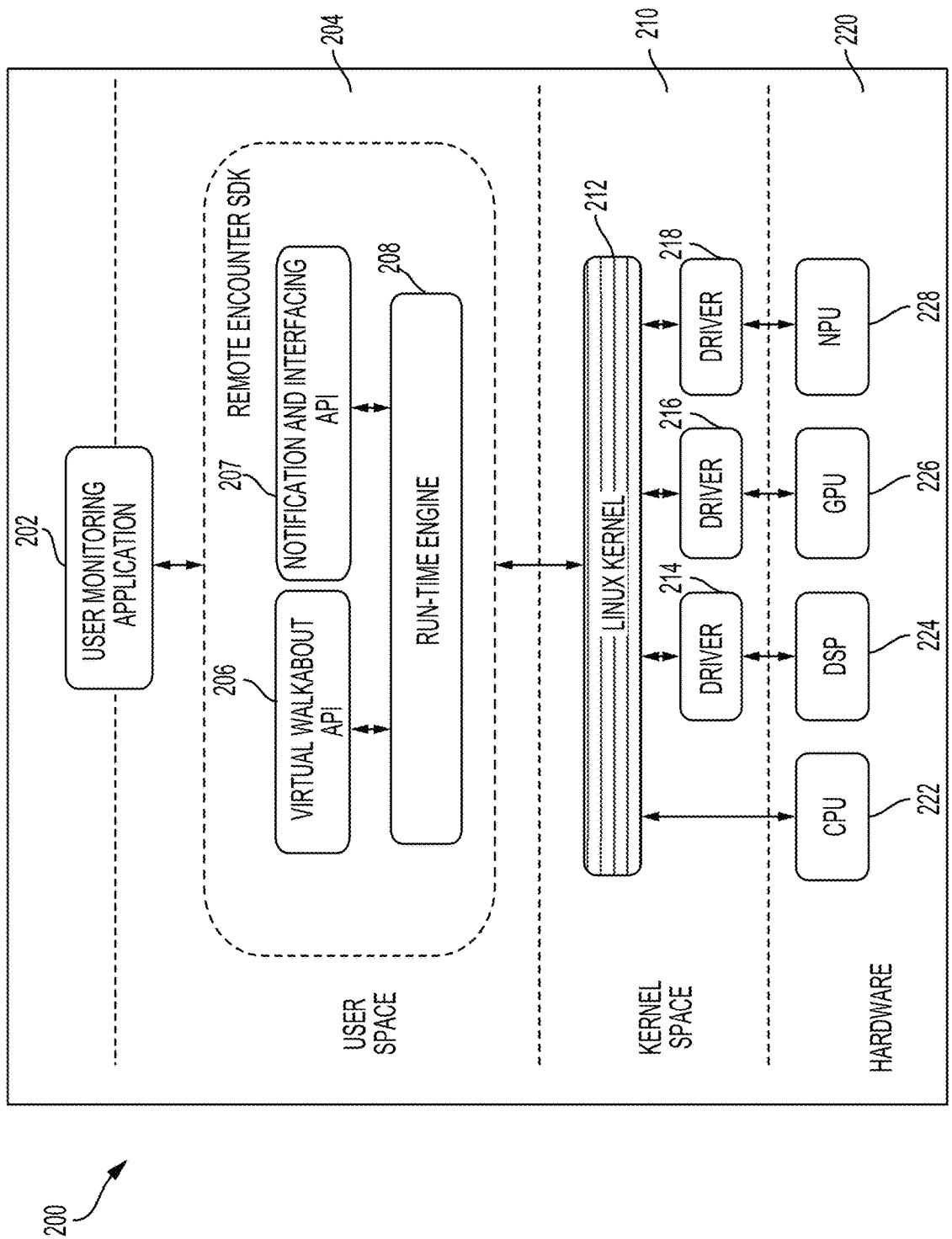
FIG. 2 is a block diagram illustrating an exemplary software architecture that may modularize artificial intelligence (AI) functions for legitimate co-worker remote encounter interactions, according to aspects of the present disclosure.

FIG. 2 is a block diagram illustrating a software architecture 200 that may modularize artificial intelligence (AI) functions for legitimate co-worker remote encounter interactions, according to aspects of the present disclosure. Using the software architecture 200, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for a co-worker remote encounter system. It should be recognized that the co-worker remote encounter is not limited to any specific employment. According to aspects of the present disclosure, the user monitoring and the co-worker remote encounter functionality is applicable to any type of employment activity.

The user monitoring application 202 may be configured to call functions defined in a user space 204 that may, for example, provide co-worker remote encounter services. The user monitoring application 202 may make a request for compiled program code associated with a library defined in a virtual walkabout application programming interface (API) 206. The virtual walkabout API 206 is configured to schedule a virtual walkabout of a user in a remote environment. The virtual walkabout API 206 is configured to identify another user in the remote environment to facilitate an interaction with during the virtual walkabout of the user.

In response, compiled program code of a notification and interfacing API 207 is configured to output a notification in response to identifying the remote co-worker in the remote environment. Additionally, the notification and interfacing API 207 is configured to interface the user with the remote co-worker to facilitate an interaction with the remote co-worker during the virtual walkabout of the user. In some aspects of the present disclosure, the notification and interfacing API 207 presence notifications are created to simulate the random walk-by encounters one might have in a physical office space.

A run-time engine 208, which may be compiled code of a run-time framework, may be further accessible to the user monitoring application 202. The user monitoring application 202 may cause the run-time engine 208, for example, to take actions for legitimate remote co-worker encounters. In response to presence notifications, the run-time engine 208 may in turn send a signal to an operating system 210, such as a Linux Kernel 212, running on the SOC 220. FIG. 2 illustrates the Linux Kernel 212 as software architecture for a co-worker remote encounter. It should be recognized, however, that aspects of the present disclosure are not limited to this exemplary software architecture. For example, other kernels may provide the software architecture to support the visual content creation functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Recent studies find that remote workers become more siloed in how they communicate, engaging in fewer real-time conversations, and spending fewer hours in meetings. Consequently, a full-time remote workforce may have a harder time acquiring and sharing new information, negatively impacting productivity and innovation among information workers in the future. By contrast, in an office, people run into each other all the time. These could be someone passing by the desk or in the kitchen getting coffee. These run-into encounters spark meetings, ideas, or just friendly banter, which is missing from remote work. A system and/or method for recreating random encounters with colleagues in a workgroup in a remote environment, is desired.

Various aspects of the present disclosure are directed to recreating random encounters with colleagues in a workgroup in a remote environment. Because the side encounters that happen in a physical office don't happen in remote workspaces, various aspects of the present disclosure are directed to recreating those passing encounters with minimal disruption to create social engagements in a remote workplace. In some aspects of the present disclosure, presence notifications are created to simulate the random walk-by encounters one might have in a physical office space, for example, as shown in FIG. 3.

Figure 3:
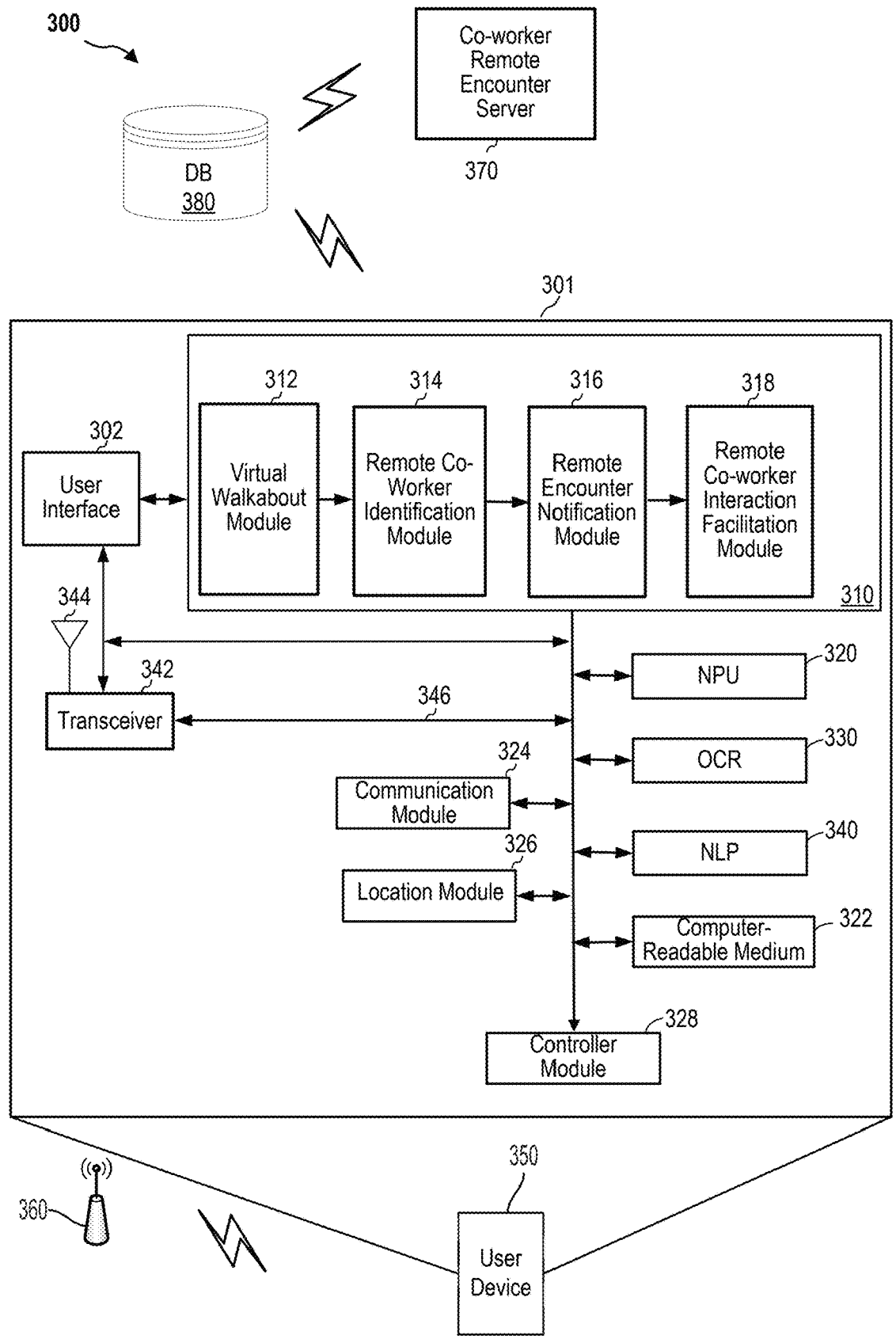
FIG. 3 is a diagram illustrating a hardware implementation for a co-worker remote encounter system, according to aspects of the present disclosure.

FIG. 3 is a diagram illustrating a hardware implementation for a co-worker remote encounter system 300, according to aspects of the present disclosure. The co-worker remote encounter system 300 may be configured to facilitate legitimate remote co-worker encounters. The co-worker remote encounter system 300 is also configured to schedule a virtual walkabout of a user in a remote environment. The co-worker remote encounter system 300 is further configured to identify a remote co-worker in the remote environment to facilitate an interaction with during the virtual walkabout of the user. The co-worker remote encounter system 300 is also configured to output a notification in response to identifying the remote co-worker user in the remote environment. The co-worker remote encounter system 300 is further configured to interface the user with the remote co-worker to facilitate an interaction with the remote co-worker during the virtual walkabout of the user.

The co-worker remote encounter system 300 includes a co-worker monitoring system 301 and a co-worker remote encounter server 370 in this aspect of the present disclosure. The co-worker monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a Smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The co-worker remote encounter server 370 may connect to the user device 350 to facilitate legitimate remote co-worker encounters. For example, the co-worker remote encounter server 370 is configured to schedule a virtual walkabout of a user in a remote environment. The co-worker remote encounter server 370 is also configured to identify a co-worker in the remote environment to facilitate an interaction with during the virtual walkabout of the user. The co-worker remote encounter server 370 is further configured to output a notification in response to identifying the co-worker in the remote environment. The co-worker remote encounter server 370 is also configured to interface the user with the co-worker to facilitate an interaction with the co-worker during the virtual walkabout of the user.

The co-worker monitoring system 301 may be implemented with an interconnected architecture, represented generally by an interconnect 346, which may be implemented as a controller area network (CAN). The interconnect 346 may include any number of point-to-point interconnects, buses, and/or bridges depending on the specific application of the co-worker monitoring system 301 and the overall design constraints. The interconnect 346 links together various circuits including one or more processors and/or hardware modules, represented by a user interface 302, a co-worker activity module 310, a neural network processor (NPU) 320, a computer-readable medium 322, a communication module 324, a location module 326, a controller module 328, an optical character recognition (OCR) 330, and a natural language processor (NLP) 340.

The interconnect 346 may also link various other circuits such as timing sources, peripherals, voltage regulators, and power management circuits, which are well known in the art, and therefore, will not be described any further.

The co-worker monitoring system 301 includes a transceiver 342 coupled to the user interface 302, the co-worker activity module 310, the NPU 320, the computer-readable medium 322, the communication module 324, the location module 326, the controller module 328, the OCR 330, and NLP 340. The transceiver 342 is coupled to an antenna 344. The transceiver 342 communicates with various other devices over a transmission medium. For example, the transceiver 342 may receive commands via transmissions from a user. In this example, the transceiver 342 may receive/transmit information for the co-worker activity module 310 to/from connected devices within the vicinity of the user device 350.

The co-worker monitoring system 301 includes the NPU 320, the OCR 330, and the NLP 340 coupled to the computer-readable medium 322. The NPU 320, the OCR 330, and NLP 340 performs processing, including the execution of software stored on the computer-readable medium 322 to provide a neural network model for user monitoring and statistical data clarification functionality according to the present disclosure. The software, when executed by the NPU 320, the OCR 330 and the NLP 340, causes the co-worker monitoring system 301 to perform the various functions described for recreating random encounters with colleagues in a workgroup in a remote environment through the user device 350, or any of the modules (e.g., 310, 324, 326, and/or 328). The computer-readable medium 322 may also be used for storing data that is manipulated by the OCR 330 and the NLP 340 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the user device 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the co-worker monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The co-worker activity module 310 may be in communication with the user interface 302, the NPU 320, the computer-readable medium 322, the communication module 324, the location module 326, the controller module 328, the OCR 330, the NLP 340, and the transceiver 342. In one configuration, the co-worker activity module 310 monitors communications from the user interface 302. The user interface 302 may monitor user communications to and from the communication module 324. According to aspects of the present disclosure, the OCR 330 and the NLP 340 automatically detect co-worker activities.

As shown in FIG. 3, the co-worker activity module 310 includes a virtual walkabout module 312, a remote co-worker identification module 314, a remote encounter notification module 316, and a remote co-worker interaction facilitation module 318. The virtual walkabout module 312, the remote co-worker identification module 314, the remote encounter notification module 316, and the remote co-worker interaction facilitation module 318, may be components of a same or different artificial neural network, such as a deep convolutional neural network (CNN). The co-worker activity module 310 is not limited to a CNN. The co-worker activity module 310 monitors and analyzes co-worker schedules and predicts schedules using, for example, the co-worker remote encounter server 370.

This configuration of the co-worker activity module 310 includes the virtual walkabout module 312 configured to schedule a virtual walkabout of a user in a remote environment. In various aspects of the present disclosure, the co-worker activity module 310 includes the remote co-worker identification module 314 configured to identify a co-worker in the remote environment to facilitate an interaction with during the virtual walkabout of the user. In this example, the co-worker activity module 310 also includes the remote encounter notification module 316 configured to output a notification in response to identifying the co-worker in the remote environment. Additionally, the co-worker activity module 310 includes the remote co-worker interaction facilitation module 318 that is configured to interface the user with the co-worker to facilitate an interaction with the co-worker during the virtual walkabout of the user. The user interface 302 for facilitating legitimate remote co-worker interaction is further illustrated, for example, in FIGS. 4A-4C.

In some aspects of the present disclosure, the co-worker activity module 310 may be implemented and/or work in conjunction with the co-worker remote encounter server 370. In one configuration, a database (DB) 380 stores data related to co-worker teams, schedules and projects, which may be displayed as output through the user interface 302. In some aspects of the present disclosure, the co-worker remote encounter system 300 may be implemented as a web browser plugin. In other aspects of the present disclosure, the co-worker remote encounter server 370 provides an offline application that scans content viewed through the user interface 302. In other aspects of the present disclosure, the co-worker remote encounter system 300 may be implemented as a mobile application to facilitate an interaction with the co-worker during the virtual walkabout of the user through the user interface 302, for example, as shown in FIGS. 4A-4C.

Figure 4A:
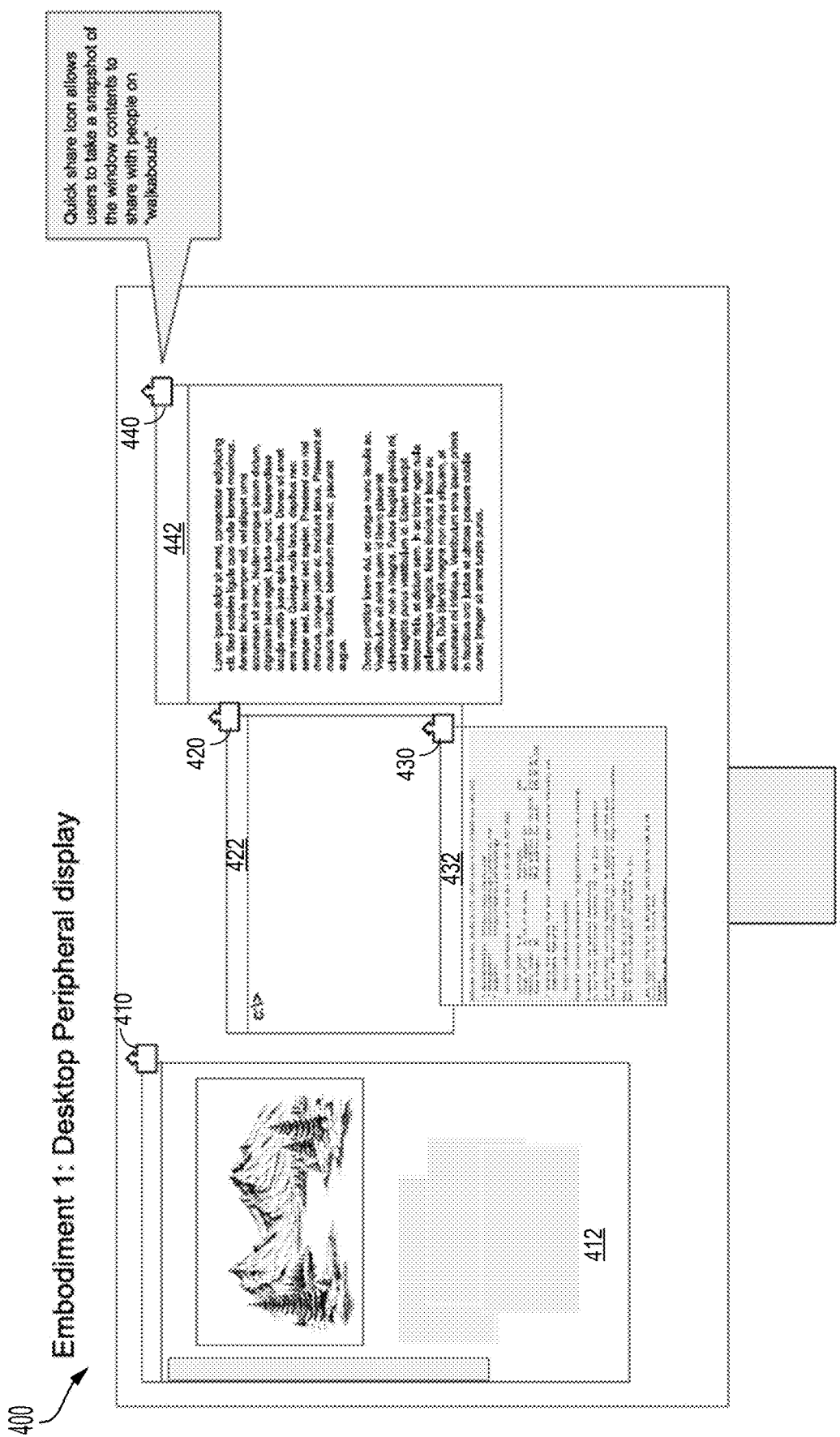
FIGS. 4A-4C are diagrams illustrating a user interface for a co-worker remote encounter system, according to various aspects of the present disclosure.
Figure 4B:
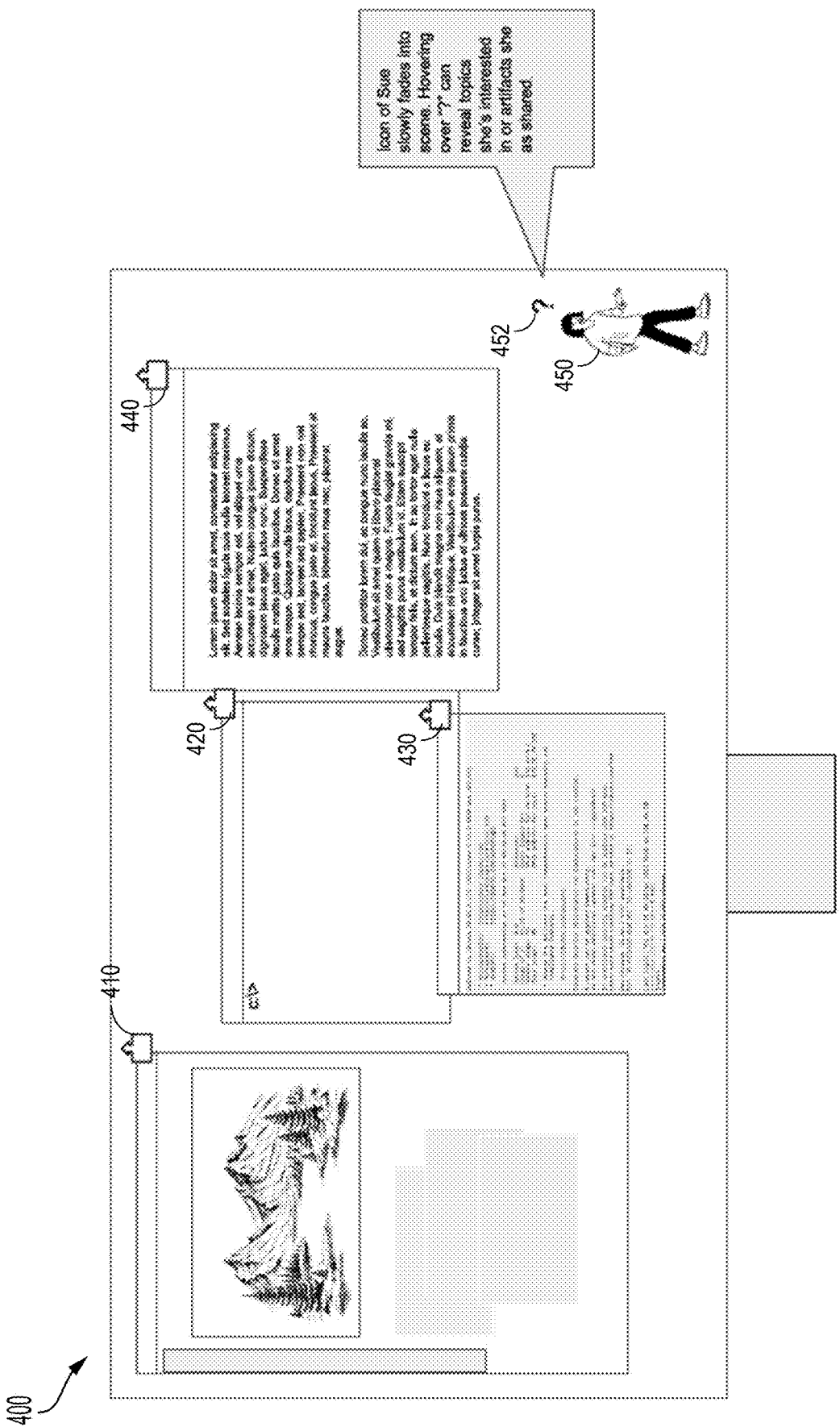
Figure 4C:
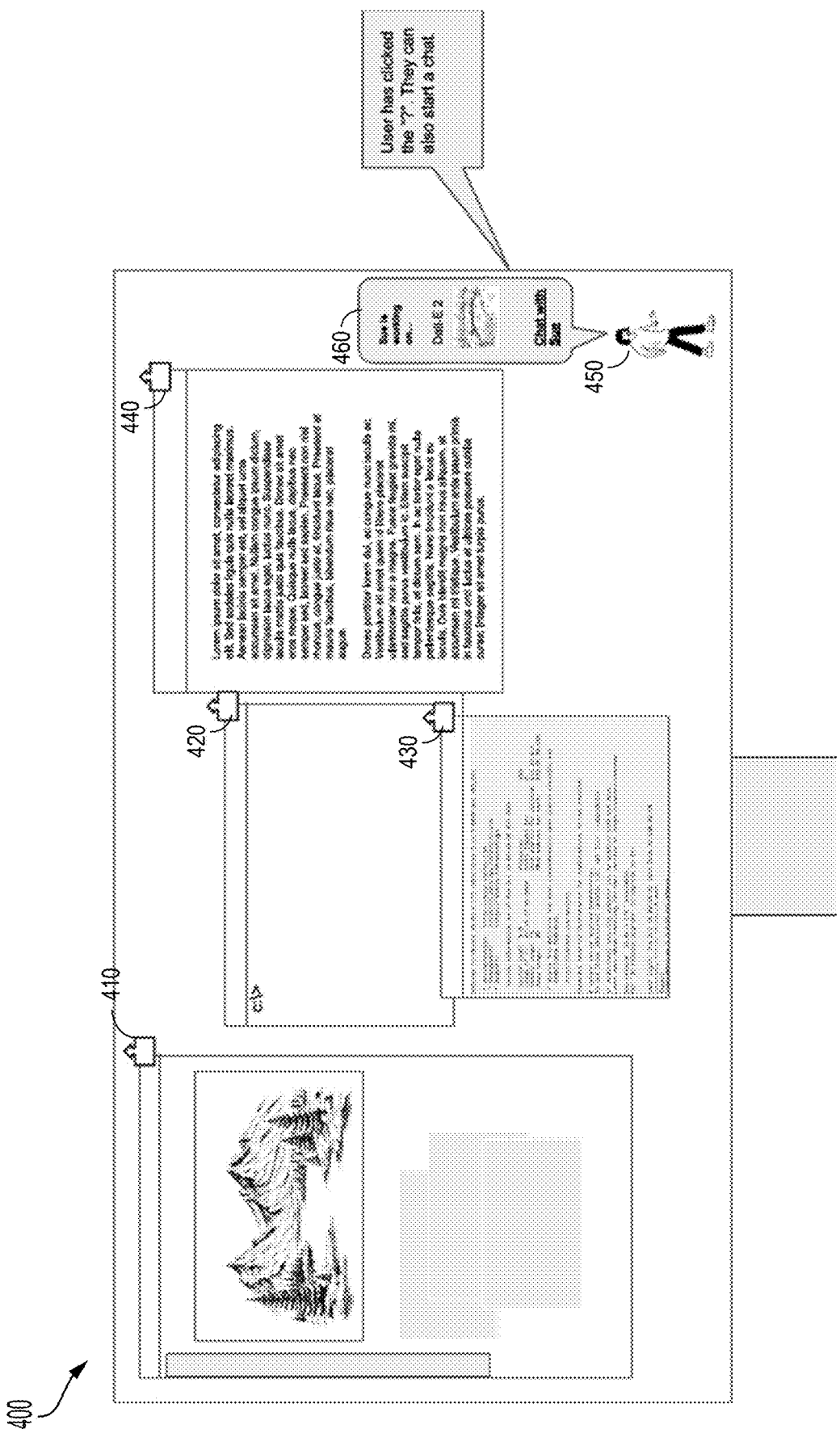

FIGS. 4A-4C are diagrams illustrating a user interface for a co-worker remote encounter system, according to various aspects of the present disclosure. As shown in FIG. 4A, a user interface 400 displays various windows, which each include a quick share icon. According to various aspects of the present disclosure, a quick share icon allows a user to take a snapshot of a window's contents to share with other co-workers on "walkabouts." For example, as shown in FIG. 4A, a first share icon 410 is visible at the upper right corner of a first window 412. Similarly, a second share icon 420 is visible at the upper right corner of a second window 422. Additionally, a third share icon 430 is visible at the upper right corner of a third window 432, and a fourth share icon 440 is visible at the upper right corner of a fourth window 442.

As shown in FIG. 4B, the user interface 400 displays a co-worker icon 450. In this example, the co-worker icon 450 slowly fades into a scene during a walkabout. Hovering over an information icon 452 (e.g., the '?') of the co-worker icon 450 can reveal topics the co-worker is interested in or artifacts the co-worker has shared. In various aspects of the present disclosure, presence notifications are created to simulate the random walk-by encounters an employee might have in a physical office space. In some aspects of the present disclosure, a co-worker remote encounter system is composed of: (1) a set of workers (remote or co-located), (2) a recommendation system that schedules encounters across co-workers that could be based on other communications or co-attending meeting, (3) some notification system that pops up to say, "Sue is nearby" (e.g., the co-worker icon 450), and (4) an interaction facilitation module. Each component operates as follows, for example, as shown in FIG. 3.

As shown in FIG. 3, a virtual walkabout module 312 operates by predicting schedules. For example, for each co-worker, a habit is computed that simulates how often the co-worker 'makes the rounds' or how available the co-worker generally behaves. For example, prediction schedules could be: (a) Ignored: Not optimal but totally randomly generated availability status is made; (b) Informed: Using their work calendar, find 'blank spots' or 'preferred spots' from the co-worker; and (c) Predicted: Predict the workers flow state and find lulls where the virtual 'walkabout' can happen; this can also use the informed features.

The remote co-worker identification module 314 operates by predicting walkabouts. For example, when a walkabout is scheduled, the system would generate quiet or ambient notifications to inform another worker that Sue is nearby using the co-worker icon 450, as shown in FIG. 4B. For example, the co-worker remote encounter system would predict, based on the worker history, how to target the walkabout (e.g., to people in meeting co-occurrences or just around the office). According to various aspects of the present disclosure, the quick share icon allows a user to take a snapshot of a window's contents to share with other co-workers on "walkabouts," for example, as shown in FIG. 4A.

Additionally, a remote encounter notification module 316 operates a notification user interface (UI)/user experience (UX). In various aspects of the present disclosure, the notification would not be immediate (as is with most notifications now) but, rather, a slow interaction to prompt another worker to 'look about.' After a timeout of several minutes, that 'virtual person walking nearby' notification would fade out, as shown in FIG. 4B. The notification can also include a "window" feature that allows others on walkabouts to view snapshots of ongoing work (e.g., by moving or copying content into a window or region of one's screen using the share icon).

As shown in FIG. 4C, the user interface 400 displays the co-worker icon 450. In this example, the user clicks the '?' of the co-worker icon 450 to reveal topics the co-worker is interested in or artifacts the co-worker has shared. As shown in FIG. 4C, clicking the information icon 452 (e.g., the '?') of the co-worker icon 450 to reveal that the co-worker on the walkabout is working on Dali-E2. Additionally, the user is provided the option to chat with the co-worker 'Sue.' In various aspects of the present disclosure, the co-worker icon 450 simulates the random walk-by encounters an employee might have in a physical office space.

As shown in FIG. 4C, the user interface 400 facilitates meaningful interactions. For example, if a worker has decided to engage in an interaction, the co-worker remote encounter system 300 supports screen sharing, with another colleague who is on a digital 'walkabout.' Additionally, the co-worker remote encounter system 300 supports expansion of the encounters beyond dyads. For example, if a particular conversation between two workers has persisted for some time, the system could use an interest detector to determine other good candidates to join the group. Shared interests could be determined using user-provided interests or a semantic mapping of file directories. Additionally, the interest detector is performed without leveraging shared interests-people could be added pseudo-randomly, accounting for conflicts such as overlapping meetings.

Figure 5A:
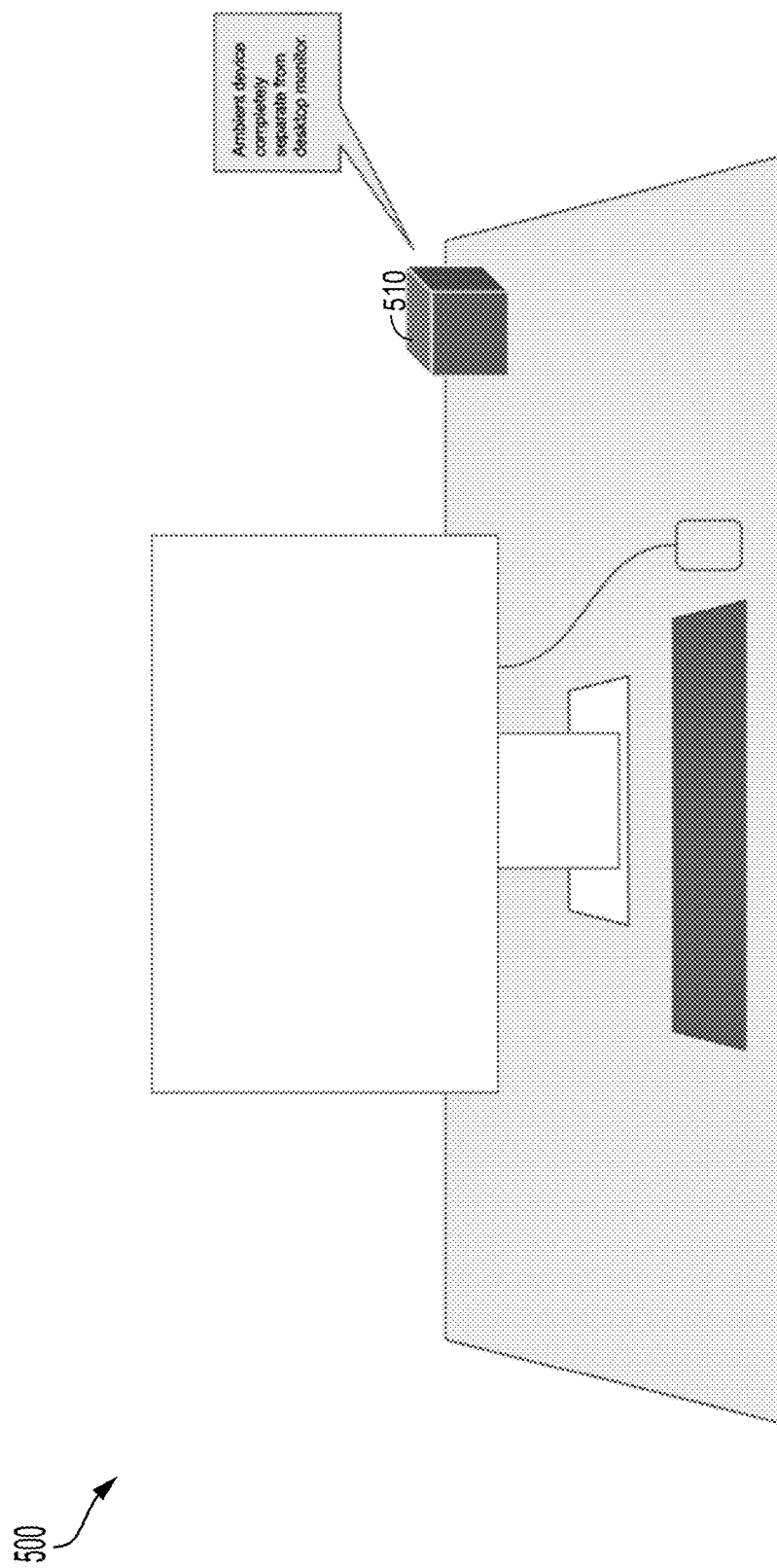
FIGS. 5A-5C are diagrams illustrating a user interface for a co-worker remote encounter system using an ambient device, according to various aspects of the present disclosure.
Figure 5B:
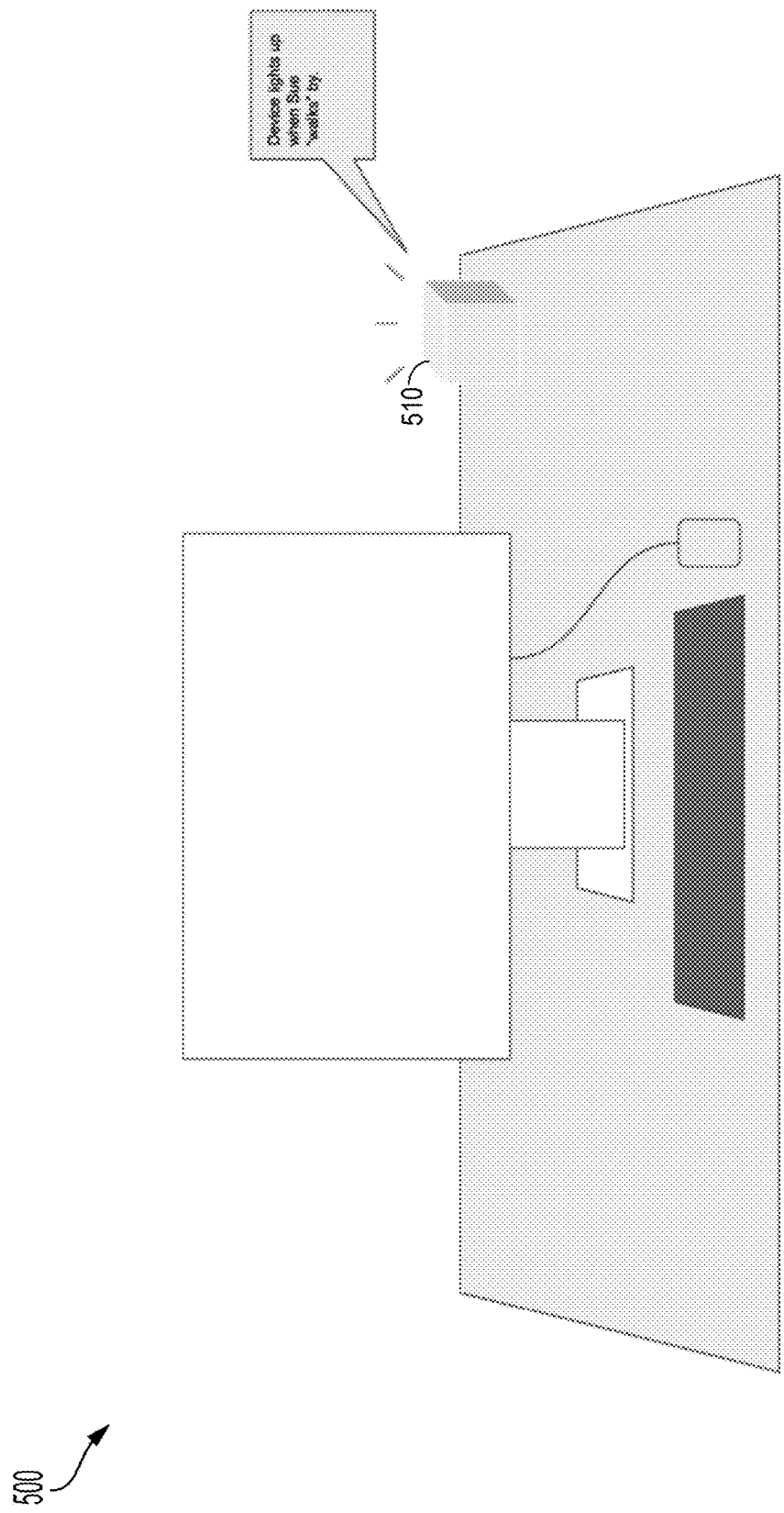
Figure 5C:
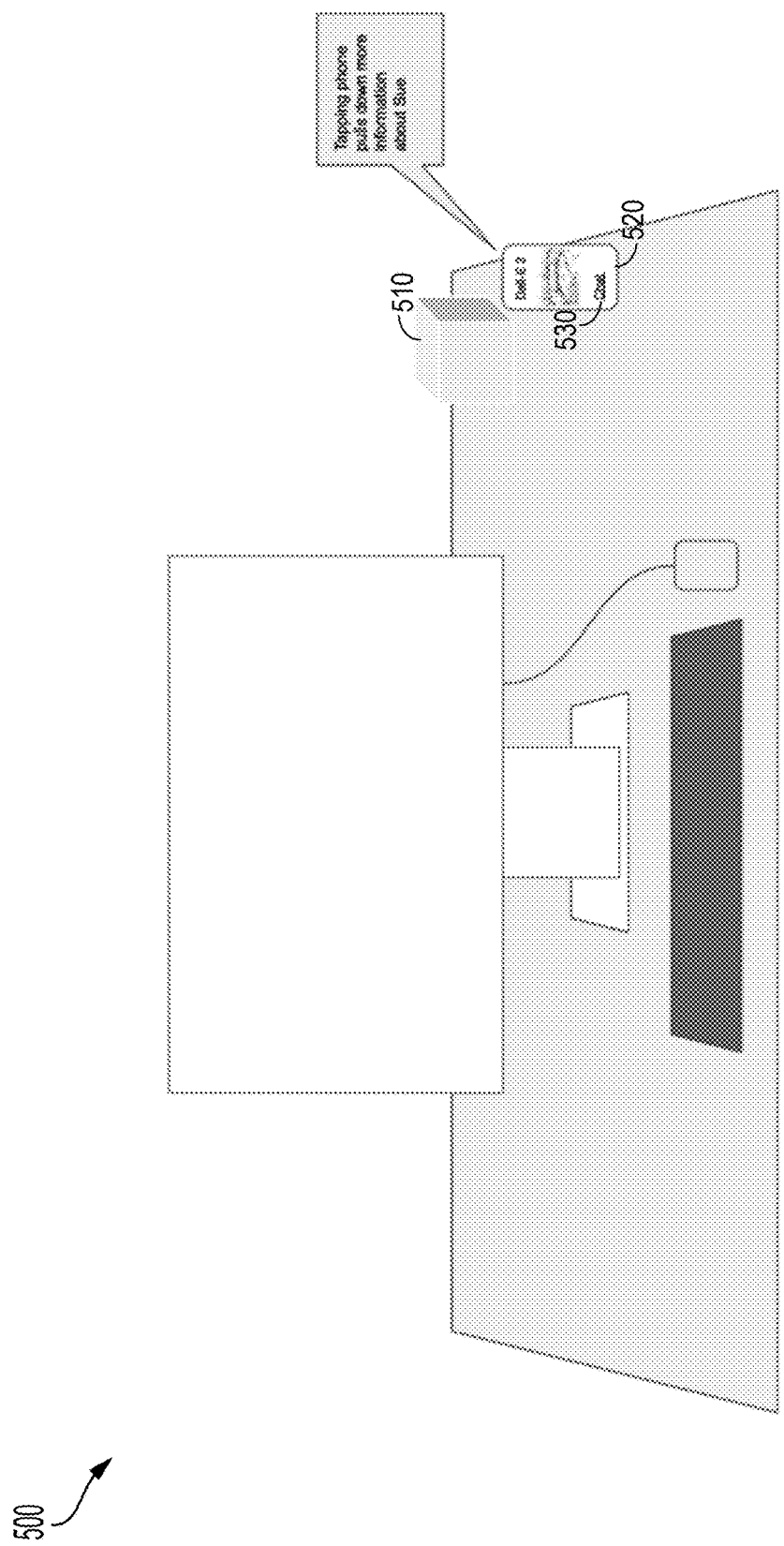

FIGS. 5A-5C are diagrams illustrating a user interface for a co-worker remote encounter system using an ambient device, according to various aspects of the present disclosure. Various aspects of the present disclosure recognize a multitude of features that would be input into a successful recommendation from the co-worker remote encounter system (though it is important to note the prediction model could be entirely random). For example, FIG. 5A provides a user experience (UX) beyond a standard push notification. In this example, an ambient device 510 is provided with a user system 500 to quietly indicate social presence of a co-worker without interrupting the target worker, for example, by flashing as shown in FIG. 5B. The ambient device 510 is also unobtrusive, observing existing interactions (that the user opted in to) and suggesting ways to deepen the interaction through new participants who have shared interests.

For example, FIG. 5C illustrate the display of a co-worker's display on a mobile device 520 in response to the user. In various aspects of the present disclosure, connecting the user and a remote co-worker (e.g., Sue) in a chat is performed in response to a user click on a chat button 530 associated with the remote employee icon. In this example, the display of the co-worker's display on the mobile device 520 includes the chat button 530, which the user may click to enter a chat with the remote co-worker. These features all support more naturalistic, empowered interactions that can build individual autonomy as well as community. Various aspects of the present disclosure further include generating a group encounter by adding additional remote employees to an interaction between the user and the remote co-worker.

Figure 6:
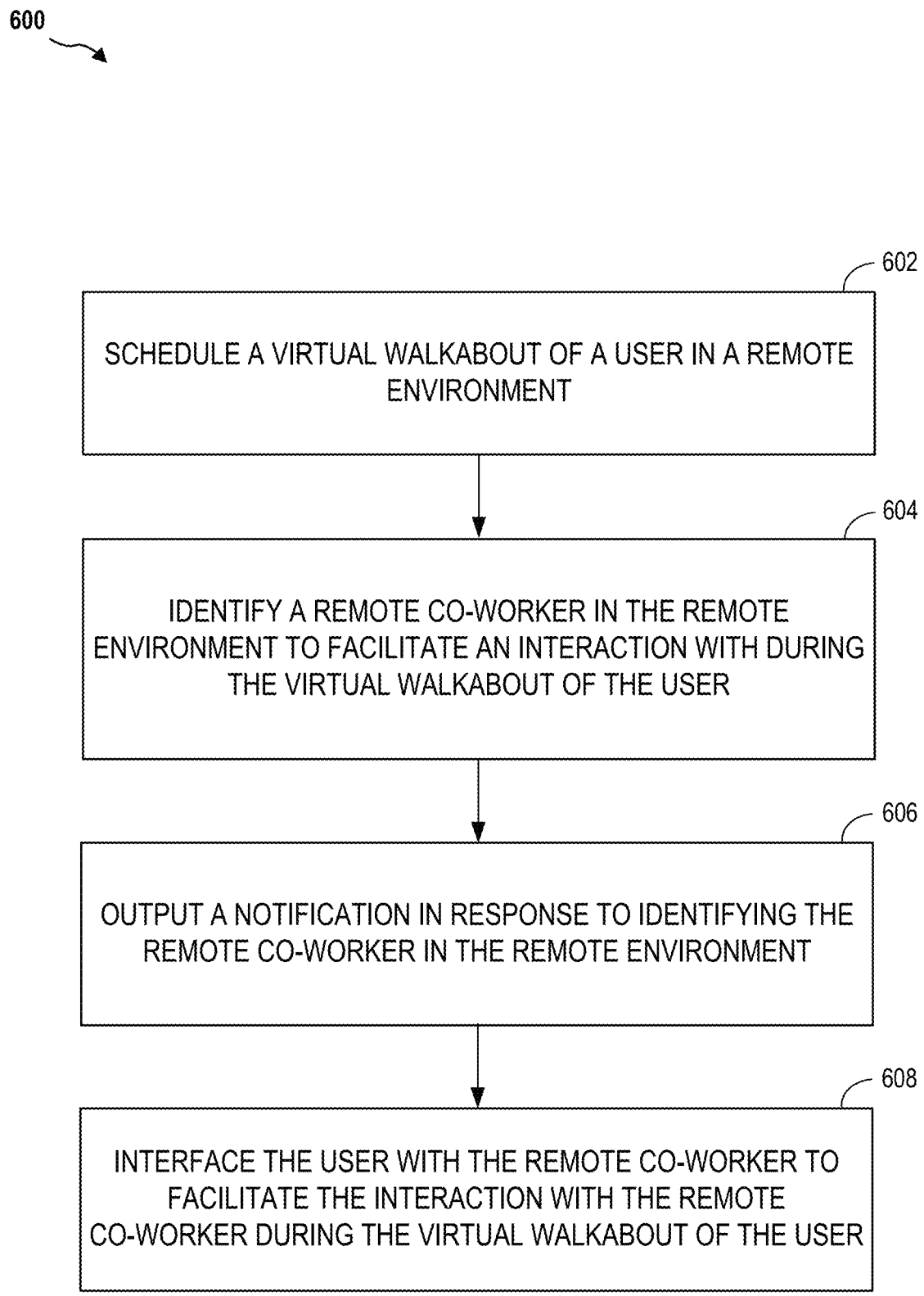
FIG. 6 is a process flow diagram illustrating a method for legitimate remote co-worker encounters, according to aspects of the present disclosure.

FIG. 6 is a process flow diagram illustrating a method 600 for legitimate remote co-worker encounters, according to aspects of the present disclosure. The method 600 begins at block 602, in which a virtual walkabout of a user is scheduled in a remote environment. For example, as shown in FIG. 3, the co-worker activity module 310 includes the virtual walkabout module 312 configured to schedule a virtual walkabout of a user in a remote environment. The virtual walkabout module 312 operates by predicting schedules. For example, for each co-worker, a habit is computed that simulates how often the co-worker 'makes the rounds' or how available the co-worker generally behaves. For example, prediction schedules could be: (a) Ignored: Not optimal but totally randomly generated availability status is made; (b) Informed: Using their work calendar, find 'blank spots' or 'preferred spots' from the co-worker; and (c) Predicted: Predict the workers flow state and find lulls where the virtual 'walkabout' can happen; this can also use the informed features.

At block 604, the remote co-worker is identified in the remote environment to facilitate an interaction with during the virtual walkabout of the user. For example, as shown in FIG. 3, the co-worker activity module 310 includes the remote co-worker identification module 314 configured to identify a co-worker in the remote environment to facilitate an interaction with during the virtual walkabout of the user. The remote co-worker identification module 314 operates by predicting walkabouts. For example, when a walkabout is scheduled, the system would generate quiet or ambient notifications to inform another worker that Sue is nearby using the co-worker icon 450, as shown in FIG. 4B. For example, the co-worker remote encounter system would predict, based on the worker history, how to target the walkabout (e.g., to people in meeting co-occurrences or just around the office). According to various aspects of the present disclosure, the quick share icon allows a user to take a snapshot of a window's contents to share with other co-workers on "walkabouts," for example, as shown in FIG. 4A.

At block 606, a notification is output in response to identifying the remote co-worker in the remote environment. For example, as shown in FIG. 3, the co-worker activity module 310 also includes the remote encounter notification module 316 configured to output a notification in response to identifying the co-worker in the remote environment. Additionally, a remote encounter notification module 316 operates a notification user interface (UI)/user experience (UX). In various aspects of the present disclosure, the notification would not be immediate (as is with most notifications now) but, rather, a slow interaction to prompt another worker to 'look about.' After a timeout of several minutes, that 'virtual person walking nearby' notification would fade out, as shown in FIG. 4B. The notification can also include a "window" feature that allows others on walkabouts to view snapshots of ongoing work (e.g., by moving or copying content into a window or region of one's screen using the share icon).

At block 608, the user is interfaced with the remote co-worker to facilitate the interaction with the remote co-worker during the virtual walkabout of the user. For example, as shown in FIG. 3, the co-worker activity module 310 includes the remote co-worker interaction facilitation module 318 that is configured to interface the user with the co-worker to facilitate an interaction with the co-worker during the virtual walkabout of the user. The user interface 302 for facilitating legitimate remote co-worker interaction is further illustrated, for example, in FIGS. 4A-4C.

The method 600 includes retrieval of the visual content by searching for visual content images between the high-level domain and the low-level domain, using a search engine. The method 600 further includes displaying, through the user interface, a first visual content image. The method 600 also includes detecting a target image in specified by the user from the visual content image. The method 600 further includes displaying a second visual content image retrieved by a search engine based on a perceptual and functional similarity to the target image specified by the user. The method 600 includes displaying, through the user interface, visual content images. The method 600 also includes detecting user-controlled filtering of unwanted visual content from the visual content images. The method 600 further includes displaying out-of-domain visual content filtered from the visual content retrieved through the user interface in response to the detecting of user-controlled filtering of unwanted visual content. The method 600 includes displaying, through the user interface, a first visual content image including the detected objects represented in bounding boxes. The method 600 also includes detecting user selection of objects in the bounding boxes. The method 600 further includes displaying a second visual content image retrieved by a search engine based on a perceptual and functional similarity to the user selected objects. The method 600 also includes the user interface configured to enable the user to specify a region in the bounding boxes to include/exclude in a search by the search engine.

Some aspects of the present disclosure are directed to addressing a desire for adaptive visual inspiration generation tools that retrieve and display functionally and perceptually similar visual content that correspond to designers' specified scope in an image content within their workspace. In various aspects of the present disclosure, a visual content creation system detects multiple objects in a given image, attaches a representative text label, and infers a high-level domain (e.g., automotive, fashion, architecture, etc.) and a low-level domain (e.g., automotive interior, automotive exterior) from the representative text label by looking at higher-level words from a lexical ontology as discussed above. This content creation system provides an interface that enables users to turn off certain word tags to filter unwanted inspirations.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for legitimate remote co-worker encounters, the method comprising:
   scheduling a virtual walkabout of a user in a remote environment;
   identifying a remote co-worker in the remote environment to facilitate an interaction with during the virtual walkabout of the user;
   outputting a notification in response to identifying the remote co-worker in the remote environment; and
   interfacing the user with the remote co-worker to facilitate the interaction with the remote co-worker during the virtual walkabout of the user.

2. The method of claim 1, further comprising:
   detecting clicking of a share icon on a window displayed by a user interface; and
   sharing contents of the window on the user interface with other co-workers.

3. The method of claim 1, further comprising displaying a co-worker icon on a user interface during the virtual walkabout of the user in the remote environment when the remote co-worker is detected.

4. The method of claim 3, further comprising:
   detecting clicking of an information icon associated with the remote co-worker icon; and
   sharing contents of a window on the user interface of the remote co-worker.

5. The method of claim 1, further comprising connecting the user and the remote co-worker in a chat in response to a user click on a chat button associated with a remote co-worker icon.

6. The method of claim 1, in which outputting the notification comprises illuminating an ambient device when the remote co-worker is detected.

7. The method of claim 1, further comprising:
   detecting clicking of an information icon associated with a remote co-worker icon; and
   sharing contents of a window on a user device of the remote co-worker.

8. The method of claim 1, further comprising generating a group encounter by adding additional remote employees to the interaction between the user and the remote co-worker.

9. A non-transitory computer-readable storage medium having program code recorded thereon for legitimate remote co-worker encounters, the program code being executed by a processor and comprising:
   program code to schedule a virtual walkabout of a user in a remote environment;
   program code to identify the remote co-worker in the remote environment to facilitate an interaction with during the virtual walkabout of the user;
   program code to output a notification in response to identifying the remote co-worker in the remote environment; and
   program code to interface the user with the remote co-worker through a display device to provide a user interface to facilitate the interaction with the remote co-worker during the virtual walkabout of the user in response to a detected user interaction with the notification.

10. The non-transitory computer-readable medium of claim 9, further comprising:
    program code to detect clicking of a share icon on a window displayed by a user interface; and
    program code to share contents of the window on the user interface with other co-workers.

11. The non-transitory computer-readable medium of claim 9, further comprising program code to display a co-worker icon on a user interface during the virtual walkabout of the user in the remote environment when the remote co-worker is detected.

12. The non-transitory computer-readable medium of claim 11, further comprising:
    program code to detect clicking of an information icon associated with the remote co-worker icon; and
    program code to share contents of a window on the user interface of the remote co-worker.

13. The non-transitory computer-readable medium of claim 9, further comprising program code to connect the user and the remote co-worker in a chat in response to a user click on a chat button associated with a remote co-worker icon.

14. The non-transitory computer-readable medium of claim 9, in which the program code to output the notification comprises program code to illuminate an ambient device when the remote co-worker is detected.

15. The non-transitory computer-readable medium of claim 9, further comprising:
   program code to detect clicking of an information icon associated with a remote co-worker icon; and
   program code to share contents of a window on a user device of the remote co-worker.

16. The non-transitory computer-readable medium of claim 9, further comprising program code to generate a group encounter by adding additional remote employees to the interaction between the user and the remote co-worker.

17. A system for legitimate remote co-worker encounters, the system comprising:
   a virtual walkabout module to schedule a virtual walkabout of a user in a remote environment;
   a remote co-worker identification module to identify the remote co-worker in the remote environment to facilitate an interaction with during the virtual walkabout of the user;
   a remote encounter notification module to output a notification in response to identifying the remote co-worker in the remote environment;
   a remote co-worker interaction facilitation module to interface the user with the remote co-worker; and
   a display device to provide a user interface to facilitate the interaction with the remote co-worker during the virtual walkabout of the user in response to detected user interaction with the notification.

18. The system of claim 17, in which the remote encounter notification module is further to display a co-worker icon on a user interface during the virtual walkabout of the user in the remote environment when the remote co-worker is detected.

19. The system of claim 17, in which the remote co-worker interaction facilitation module is further to connect the user and the remote co-worker in a chat in response to a user click on a chat button associated with a remote co-worker icon.

20. The system of claim 17, in which the remote encounter notification module is further to output the notification by illuminating an ambient device when the remote co-worker is detected.

* * * * *